US007761547B2

(12) United States Patent
Matsubara et al.

(10) Patent No.: US 7,761,547 B2
(45) Date of Patent: Jul. 20, 2010

(54) NETWORK SYSTEM PERFORMING APPLICATION CONTROL BASED ON CONTEXT INFORMATION

(75) Inventors: Daisuke Matsubara, Kodaira (JP); Hideya Yoshiuchi, Kokubunji (JP); Norihiko Moriwaki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 542 days.

(21) Appl. No.: 11/316,831

(22) Filed: Dec. 27, 2005

(65) Prior Publication Data
US 2006/0277296 A1 Dec. 7, 2006

(30) Foreign Application Priority Data
Jun. 1, 2005 (JP) ............................. 2005-160871

(51) Int. Cl.
G06F 15/173 (2006.01)
(52) U.S. Cl. .................. 709/223; 709/224; 709/225; 709/226; 709/228; 709/229; 370/260; 455/456.1; 455/456.5
(58) Field of Classification Search ........................ None
See application file for complete search history.

(56) References Cited
U.S. PATENT DOCUMENTS 6,781,963 B2 * 8/2004 Crockett et al. ............. 370/260
6,810,259 B1 * 10/2004 Zhang ...................... 455/456.5
6,839,024 B2 * 1/2005 Spilker et al. ................ 342/386
7,035,658 B2 * 4/2006 Drozt et al. .................. 455/519
7,107,017 B2 * 9/2006 Koskelainen et al. ........ 455/90.2
7,170,863 B1 * 1/2007 Denman et al. ............. 370/260
7,405,653 B2 * 7/2008 Tice et al. ............. 340/539.12
7,418,084 B2 * 8/2008 Ruetschi et al. .......... 379/32.01
2006/0159238 A1 * 7/2006 Akita et al. ................. 379/67.1
2006/0270430 A1 * 11/2006 Milstein et al. ............. 455/518
2007/0116224 A1 * 5/2007 Burke et al. ............ 379/201.12
2007/0189301 A1 * 8/2007 Kiss et al. ................. 370/395.2
2007/0266089 A1 * 11/2007 Atarius et al. ............... 709/204

FOREIGN PATENT DOCUMENTS

JP 09-008942 6/1995
JP 2003-309657 4/2002

* cited by examiner

Primary Examiner—Rupal D Dharia
Assistant Examiner—Van Kim T Nguyen
(74) Attorney, Agent, or Firm—Stites & Harbison, PLLC; Juan Carlos A. Marquez, Esq.

(57) ABSTRACT

A communication application control technology in which the location and status (context) of a user from a sensor net, and the communication application is controlled based on the context information. A sensor net server (or a presence server) manages the location and status of a user as well as group information detected by a sensor, and an application server obtains the user information included in the group from the sensor net server (or a presence server), and establishes a session with that user. This invention is applicable to various applications including the PTT (Push-to-Talk) and 3PCC.

4 Claims, 17 Drawing Sheets

FIG.10

USER LOCATION MANAGEMENT TABLE

| USER ID | BS ID |
|---------|-------|
| xxx | 001 |
| xyz | 001 |
| aaa | 002 |
| xxw | 003 |
| zzy | 003 |

FIG.11

GROUP MANAGEMENT TABLE

| BS ID | GROUP ID |
|---|---|
| 001 | 001 |
| 002 | 001 |
| 003 | 002 |
| 004 | 003 |
| 005 | 003 |

FIG.12

GROUP MANAGEMENT TABLE

| USER ID | GROUP ID |
|---------|----------|
| xxx | 001 |
| xyz | 001 |
| aaa | 001 |
| xxw | 002 |
| zzy | 002 |
| ⋮ | ⋮ |

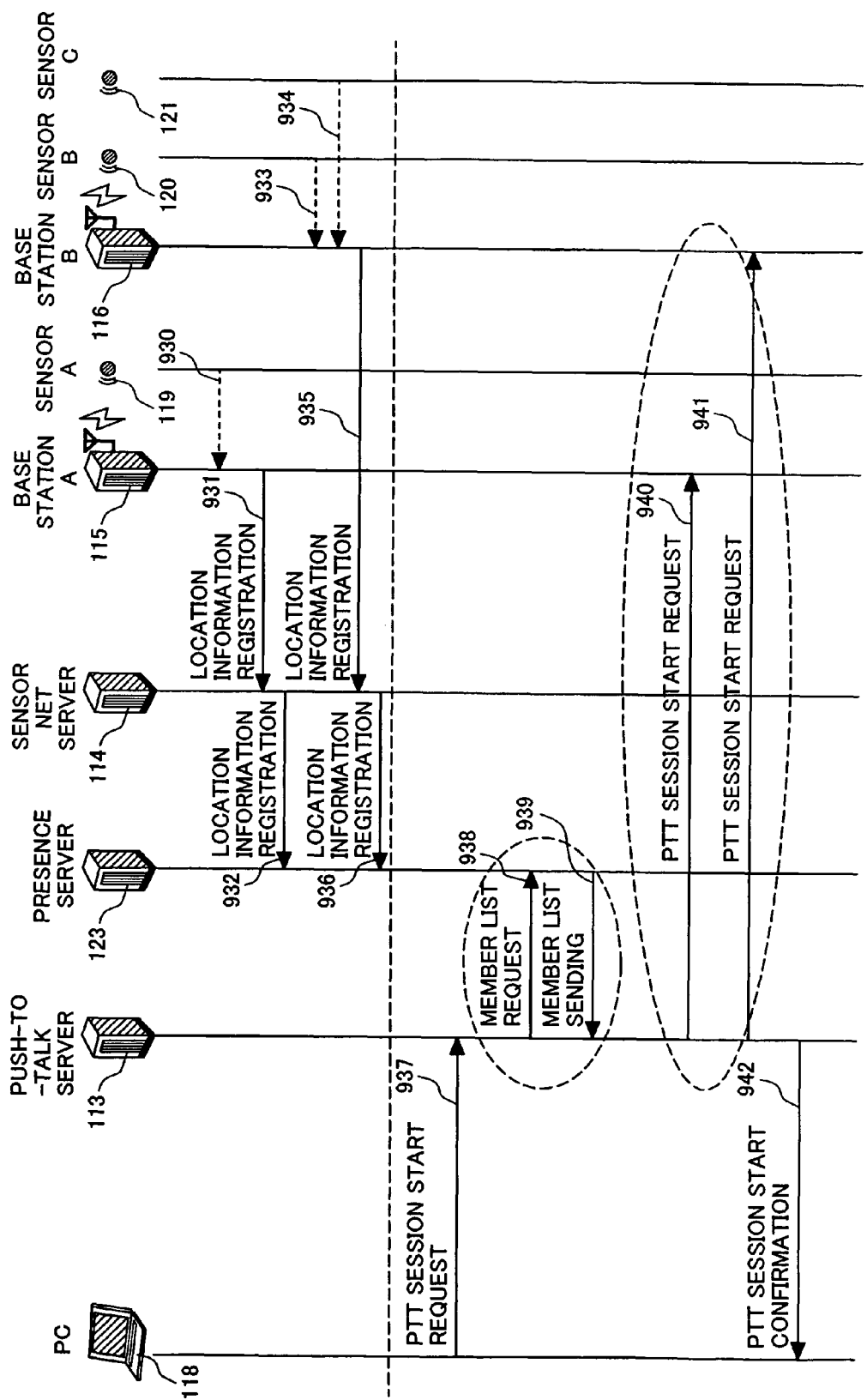

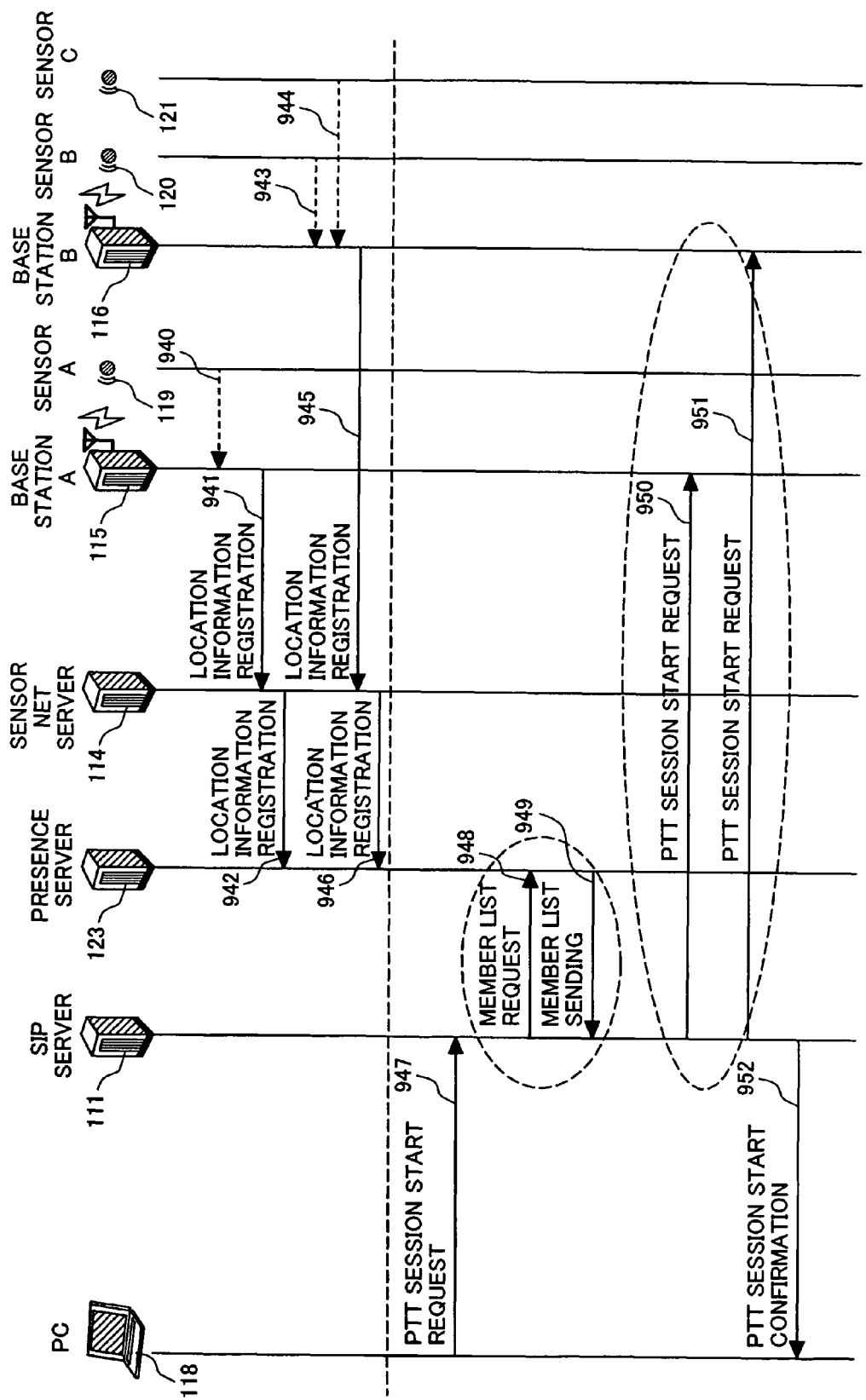

NETWORK SYSTEM PERFORMING APPLICATION CONTROL BASED ON CONTEXT INFORMATION

CLAIM OF PRIORITY

The present application claims priority from Japanese application JP 2005-160871 filed on Jun. 1, 2005, the content of which is hereby incorporated by reference into this application.

FIELD OF THE INVENTION

The present invention relates to an application control system that controls applications based on the context information of users.

BACKGROUND OF THE INVENTION

In application systems performing session control, an initiating user generally establishes a session by specifying an identifier or icon assigned to a particular user to communicate with, when initiating a session. As an example, in the system described in JP-A No. 8942/1997, a user specifies an identifier in the text displayed on the terminal screen, and establishes a session with the user indicated by that identifier. In these systems, users specified by identifiers are often fixed unless the system administrator or the user himself changes the identifier. In addition, there is a system disclosed in JP-A No. 309657/2003, in which a session is allocated according to the ability of the receiving operator and/or the availability of lines, but there is no system in which a receiving user with which a session is established is dynamically changed according to the current location and/or status of the initiating user.

SUMMARY OF THE INVENTION

In a conventional system, it is impossible to perform a communication by specifying the location and/or status (hereinafter referred to as context information) of the user.

To overcome the above problem, according to an application control system of the present invention, in a network system comprising a plurality of client devices and an application server, a plurality of sensors, a plurality of base stations that terminates the wireless communications from the sensors, and a sensor net server, the sensor net server dynamically group the users based on the location information detected by the sensors, and the application server controls the application using the groups.

According to the present invention, it is possible to control the application for a user at a specific location and in a specific situation (this information is called context information).

BRIEF DESCRIPTION OF THE DRAWINGS

FIG. 10 shows an example user location management table of the sensor net server of FIG. 2;

FIG. 11 shows an example group management table of the sensor net server of FIG. 2;

FIG. 12 shows an example group management table of the PTT server of FIG. 3;

FIG. 17 is another example of the 3PCC application control sequence of the system of FIG. 1; and FIG. 18 is another example of the 3PCC application control sequence of the system of FIG. 1.

DETAILED DESCRIPTION OF THE PREFERRED EMBODIMENTS

First Embodiment

Figure 1:
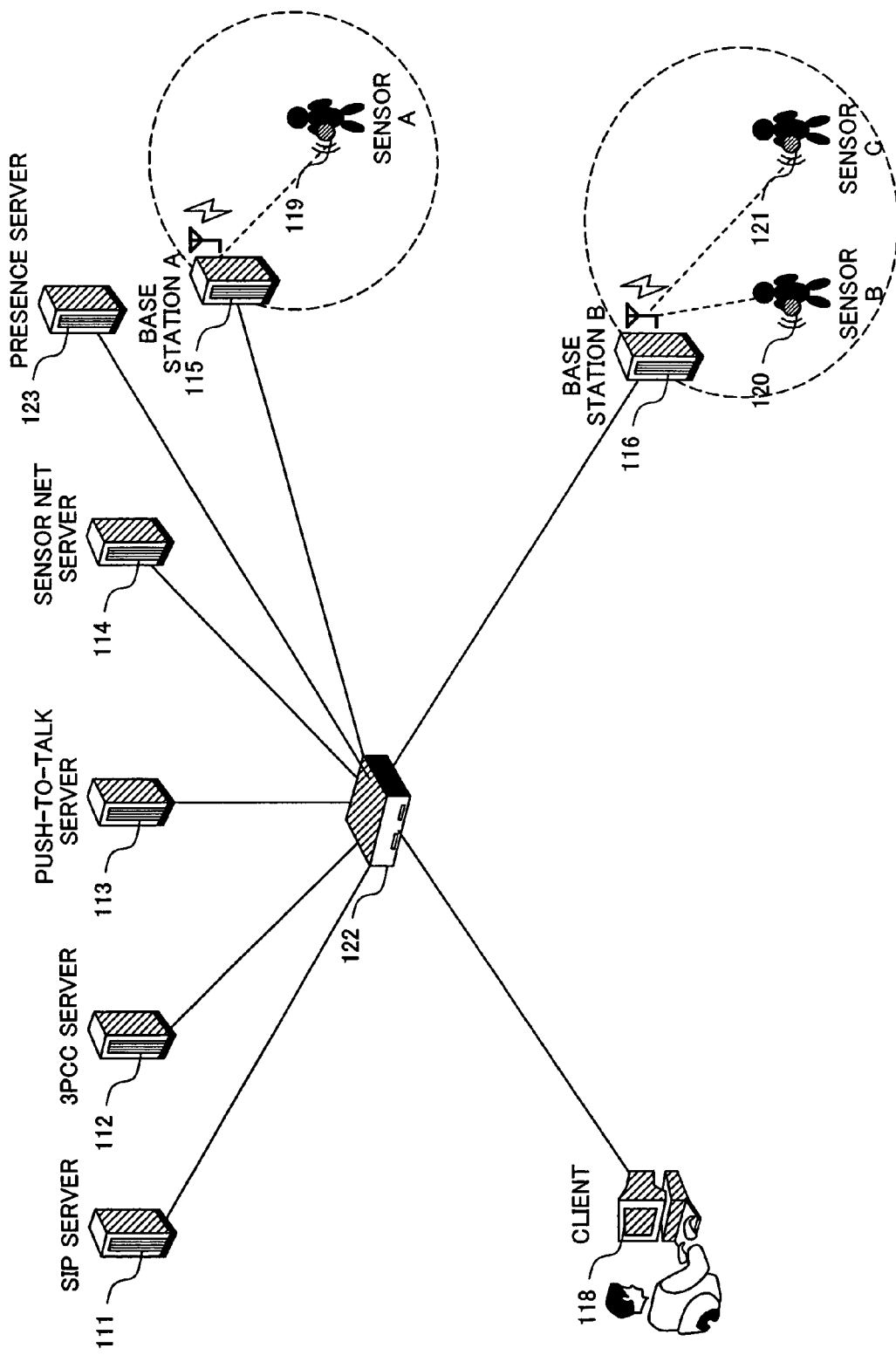
FIG. 1 is a diagram showing the entire system configuration of the present invention.

The system according to the present invention is described below in detail with reference to the embodiments shown in the drawings.

FIG. 1 is a diagram showing the configuration of an application control system according to one embodiment of the present invention, which comprises a SIP server 111, a teleconference system server (hereinafter called a 3PCC server) 112, a Push-to-Talk (hereinafter call PTT) server 113, a sensor net server 114, base stations 115 and 116, a network device 122, and a client 118 connected to the network device 122. The PTT is one-way voice communication such as by a transceiver as described in JP-A No. 125337/1994. The sensor A 119 is wirelessly connected to the base station A 115 and the sensors B 120 and C 121 are wirelessly connected to the base station B. The sensors A 119, B 120, and C 121 are attached to the labels of particular users respectively, and permanently assigned to those users. When the base station detects a sensor, the user location information is communicated to the sensor net server. In addition, the sensor has a PTT function that allows PTT communications by means of a microphone and a speaker contained therein.

Figure 2:
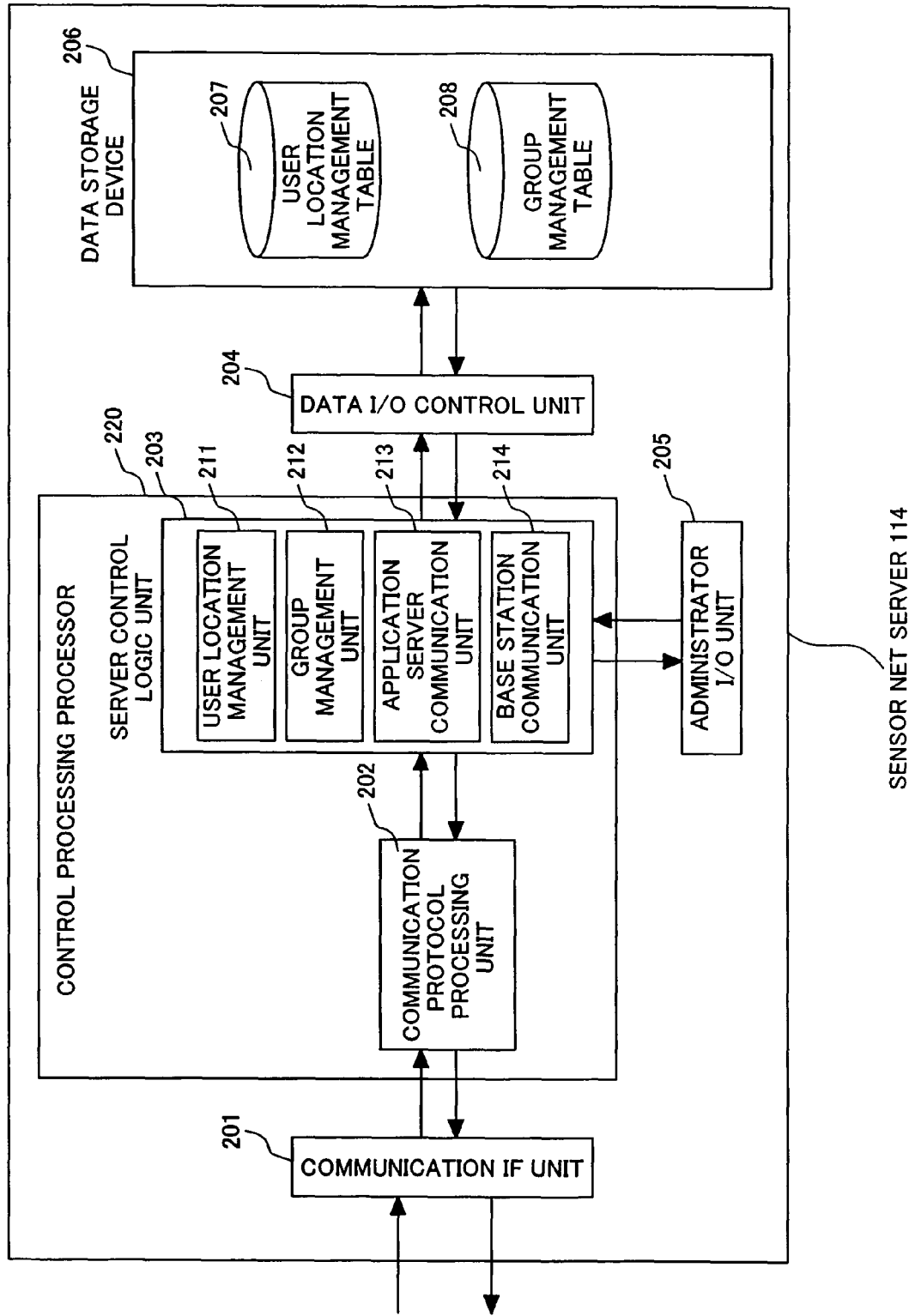
FIG. 2 is a block diagram showing the internal configuration of a sensor net server of the present invention.

FIG. 2 shows an example of the internal configuration of the sensor net server 114. This device comprises a communication IF unit 201, a control processing processor 220, a data I/O control unit 204, a data storage device 206, and an administrator I/O unit 205, which constitute a physical block. The control processing processor 220 comprises a communication protocol processing unit 202 and a server control logic unit 203, which constitute a logical block. Further, the server control logic unit consists of a user location management unit 211, a group administration unit 212, an application server communication unit 213, and a base station communication unit 214. The data storage device 203 stores a user location management table 207 and a group management table 208.

Figure 3:
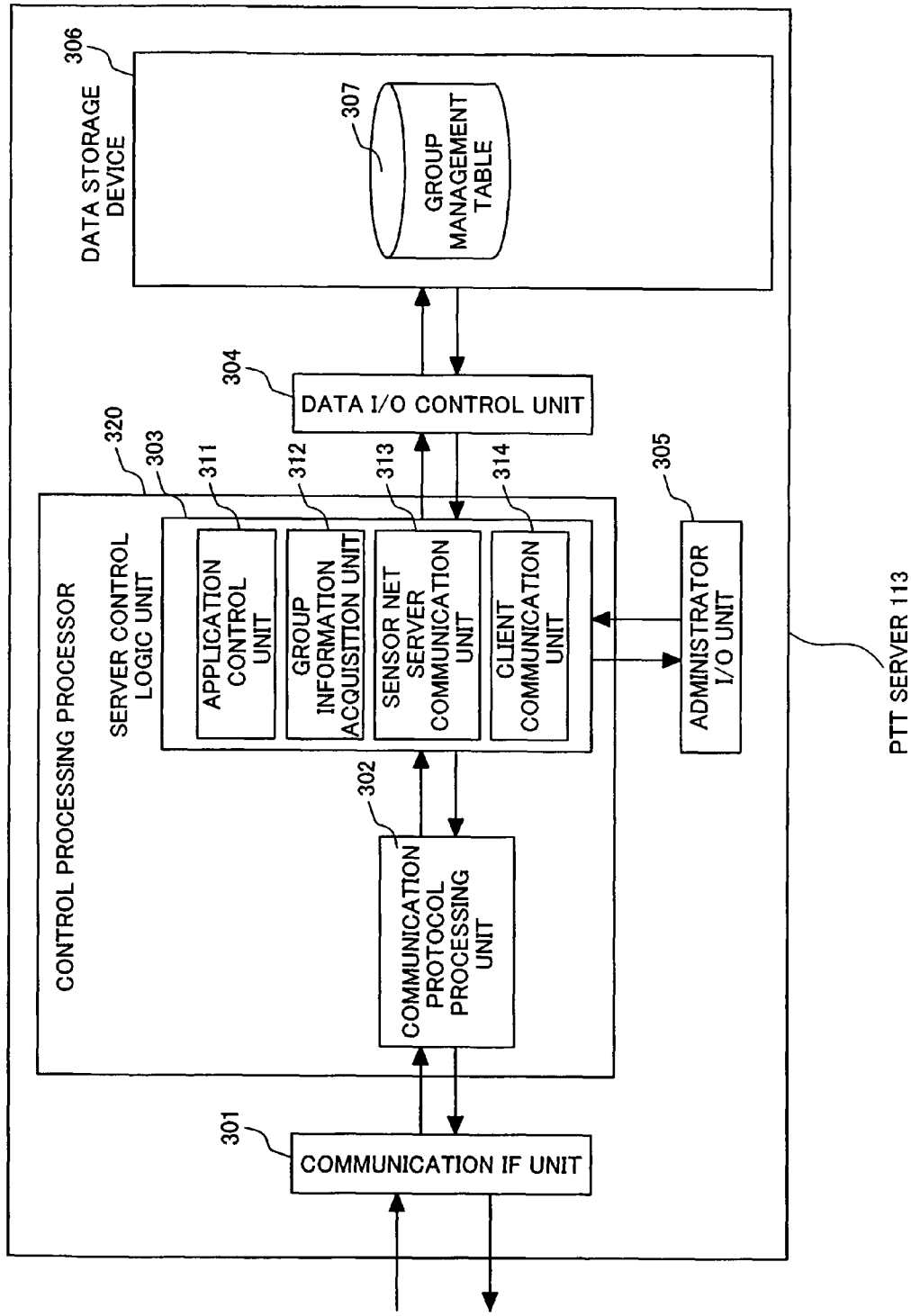
FIG. 3 is a block diagram showing the internal configuration of a PTT server of the present invention.

FIG. 3 shows an example of the internal configuration of the PTT server 113. This device comprises a communication IF unit 301, a control processing processor 320, a data I/O control unit 304, a data storage device 306, and an administrator I/O unit 305, which constitute a physical block. The control processing processor 320 comprises a communication protocol processing unit 302 and a server control logic 303, which constitute a logical block. Further, the server control logic unit 303 consists of an application control unit 311, a group information acquisition unit 312, a sensor net server communication unit 313, and a client communication unit 314. The data storage device 306 stores a group management table 307.

Figure 4:
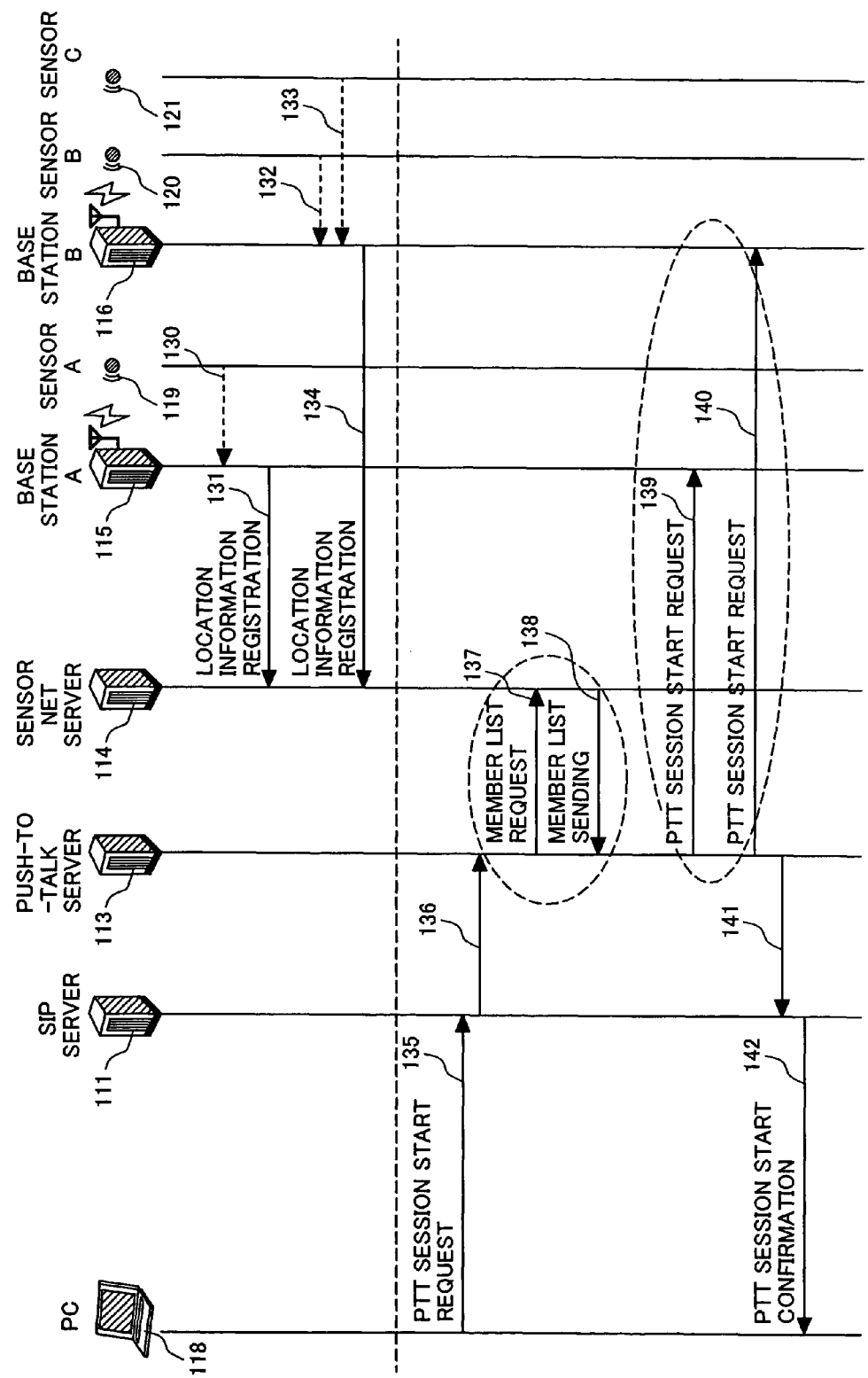
FIG. 4 shows an example PTT application control sequence in the system of FIG. 1.

FIG. 4 shows an example of the PTT session control sequence in this system. First, the following describes steps 130 to 134, in which user location information is registered by the sensor. At step 130, the sensor A 119 wirelessly communicates the location information to the base station A 115. The base station A 115 sends the location information obtained from the sensor A 119 to the sensor net server 114. The sensor net server 114 registers the received location information with the user location management table 207. Similarly, the sensors B 120 and C 121 communicate with the base station 116, and the sensor net server 114 registers the location information received from the base station B 116.

Next, the following describes steps 135 to 142 in which a PTT session is established to a group in response to a request from a user. At steps 135 and 136, the PC 118 sends a PTT session start request to the PTT server 113 via the SIP server 111. The PTT session start request contains the group ID of a group with which to communicate. The PTT server 113 sends a member list request to the sensor net server 114 at step 137. The member list request contains the group ID. At step 138, the sensor net server 114 sends a member list to the PTT server. The member list includes a list of users in the group with the group ID. The PTT server 113 sends a PTT session request, at steps 139 and 140, to the base stations A 115 and B 116 with which the users in the member list are registered. Finally, the PTT server 113 sends a PTT session start confirmation to the PC 118 at step 114, thereby establishing a PTT session between the PC 118 and the sensors A 119 and B 120.

According to this system, it is not necessary to send an update message from the sensor net server 114 to the PTT server every time user location information is updated.

Second Embodiment

Figure 5:
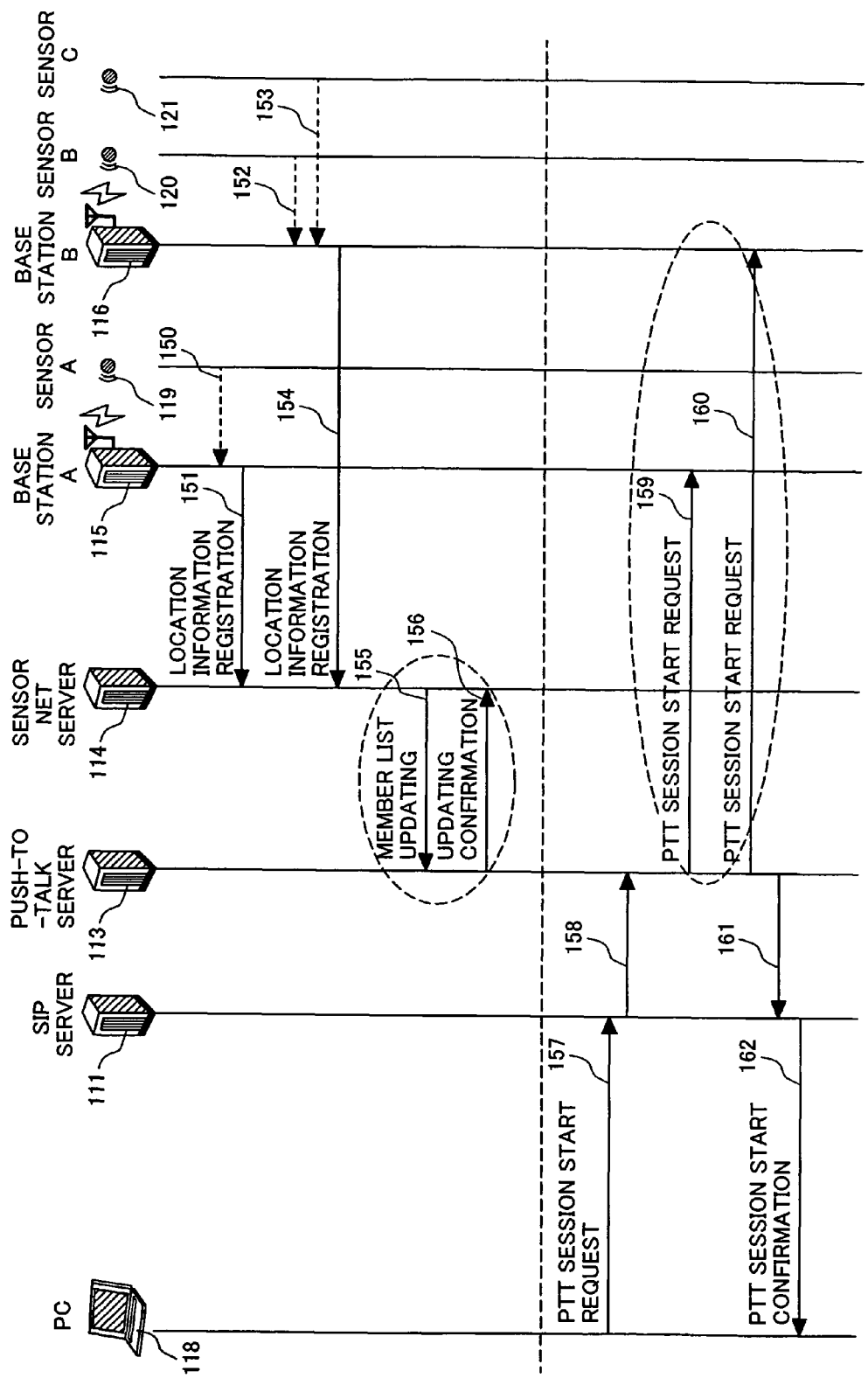
FIG. 5 shows another example PTT application control sequence in the system of FIG. 1.

FIG. 5 shows another example of the PTT session control sequence in this system. Steps 150 to 154 in which user location information is registered with the sensor net server by the sensor are the same as steps 130 to 134 described above. At step 155, the sensor net server 114 sends a member list updating request to the PTT server 113, and at step 156 the PTT server 113 sends an update confirmation to the sensor net server 114.

Next, the following describes steps 157 through 162 in which a PTT session with a group is established in response to a user request. At steps 157 and 158, the PC 118 sends a PTT session start request to the PTT server 113 via the server 111. The PTT session start request contains the group ID of a group to talk with. The PTT server 113 sends a PTT session request, at steps 159 and 160, to the base stations A 115 and B 116 with which users included in the group ID are registered. Finally, at steps 161 and 162, the PTT server sends a PTT session start confirmation to the PC 118 to establish a PTT session between the PC 118 and the sensors A 119 and B 120.

In this system, although it is necessary to send an update massage from the sensor net server 114 to the PTT server 113 every time user location information is updated. The PTT server 113 can establish a session independently without referring to the sensor net server 114.

Third Embodiment

Figure 13:
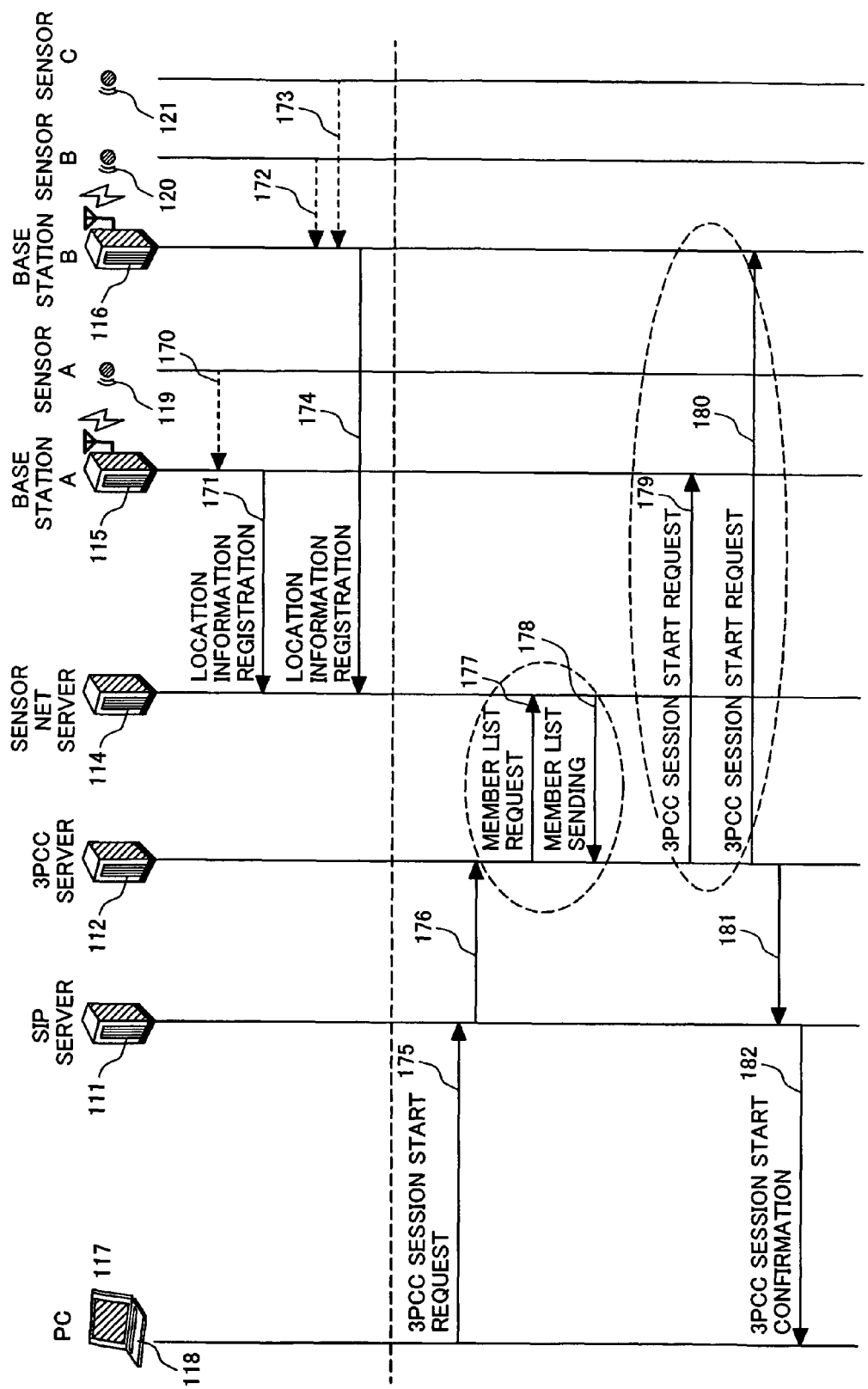
FIG. 13 is an example of the 3PCC application control sequence of the system of FIG. 1.
Figure 14:
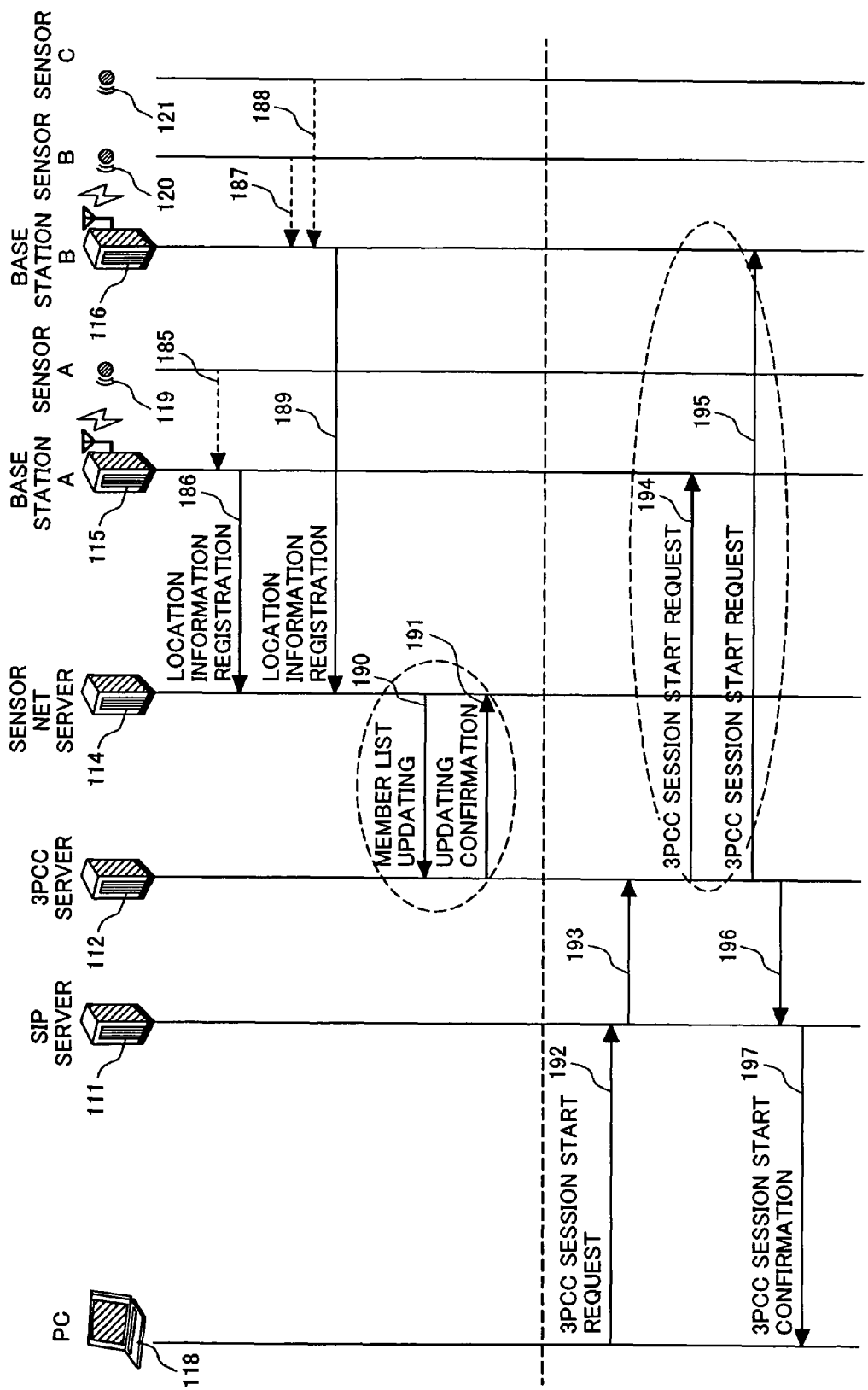
FIG. 14 is another example of the 3PCC application control sequence of the system of FIG. 1.

FIGS. 13 and 14 show an example of the 3PCC session control sequence in this system. The sequence in FIG. 13 is the same as that in FIGS. 4 and 5, except that steps 175, 176, 179, and 180 (in FIG. 14, steps 192, 193, 194, and 195) are for a 3PCC session start request, and that steps 181 and 182 (in FIG. 14, steps 196 and 197) are for a 3PCC session start confirmation.

This system allows the application control using context information on users other than the location information.

Fourth Embodiment

Figure 16:
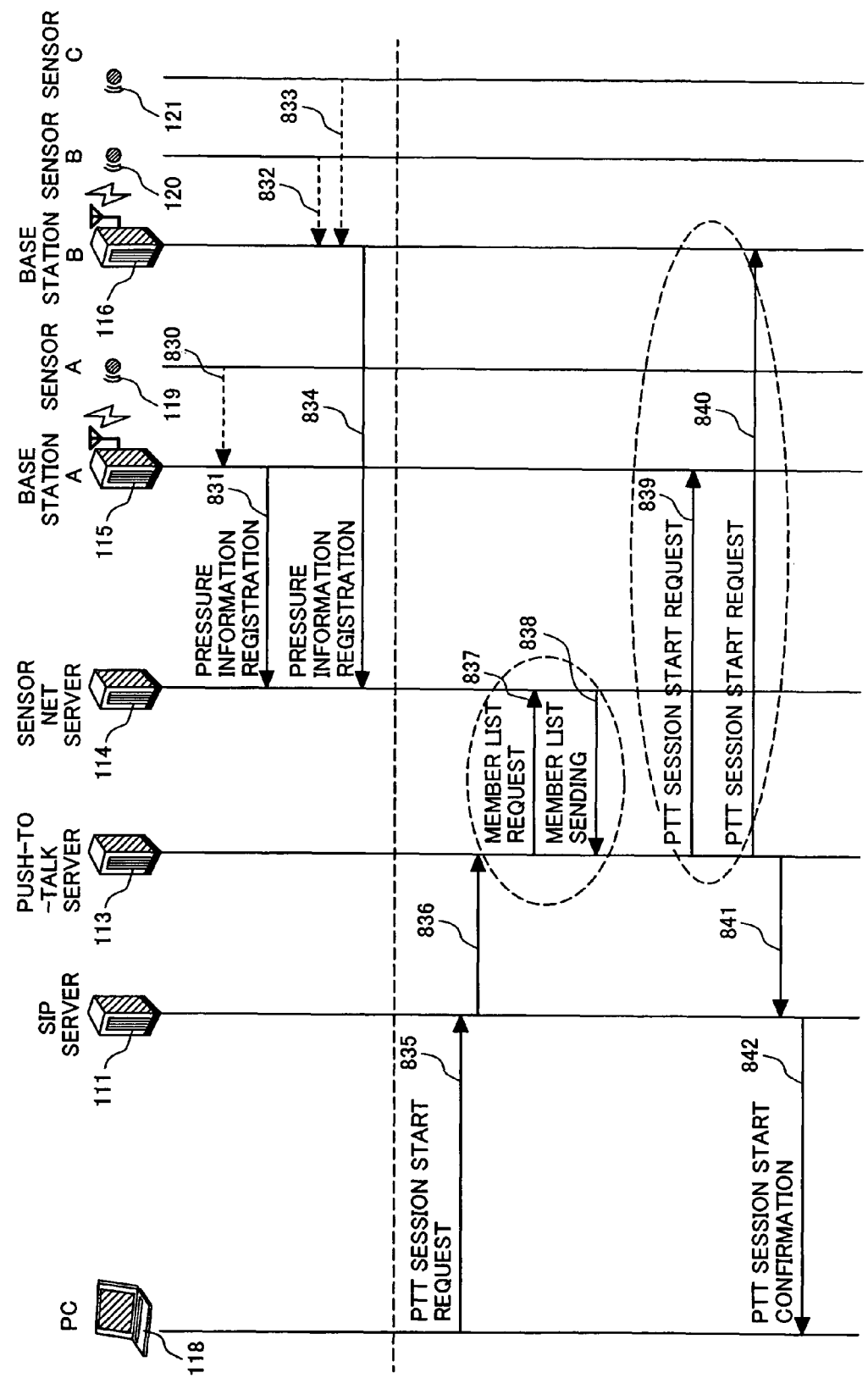
FIG. 16 is another example of the 3PCC application control sequence of the system of FIG. 1.

FIG. 16 shows another example of the sequence in which a sensor determines whether a user is sitting on a chair by detecting a pressure on the chair, and thereby groups the users into standing users and sitting ones. The sequence in FIG. 16 is the same as that in FIG. 4 except that steps 831 and 834 are for a pressure information registration. Also, in this example, the user location management table 207 in FIG. 2 is replaced with a user pressure management table, and the 722 in FIG. 10 replaced with a pressure value.

This system allows automatically grouping the sitting status of a user by means of a sensor that detects a pressure. For example, it is possible to "establish a PTT session with a sitting user".

Fifth Embodiment

FIG. 17 describes a case where a presence server 123 is placed between the sensor net server 114 and the PTT server 113, as another example of this system. In the sequence in FIG. 17, the sensor net server transfers a location information registration to the presence server 123 at steps 932 and 936. The PTT server 113 sends a member list request to the presence server 123 at step 938, and the presence server 123 sends a member list sending to the PTT server at step 939.

This system allows the unified control of the user information obtained from the presence information by the presence server that manages presence information.

Sixth Embodiment

FIG. 18 describes a case where an SIP server 111 refers to the presence server 123 for the information on a group. In the sequence shown in FIG. 18, the SIP server 111 sends a member list request to the presence server at step 948, and the presence server 123 sends a member list sending to the SIP server 111 at step 949. The SIP server 111 sends a PTT session request, at steps 950 and 951, to the base stations A 115 and B 116 with which users included in the group ID in the received member list are registered. Finally, the SIP server 111 sends a PTT session start confirmation to the PC 118, at step 952, to establish a PTT session between the PC 118 and the sensors A 119 and B 120.

This system allows establishing a VoIP session with a group when establishing a session only between the SIP servers, as in the VoIP (Voice over IP).

Seventh Embodiment

Figure 15:
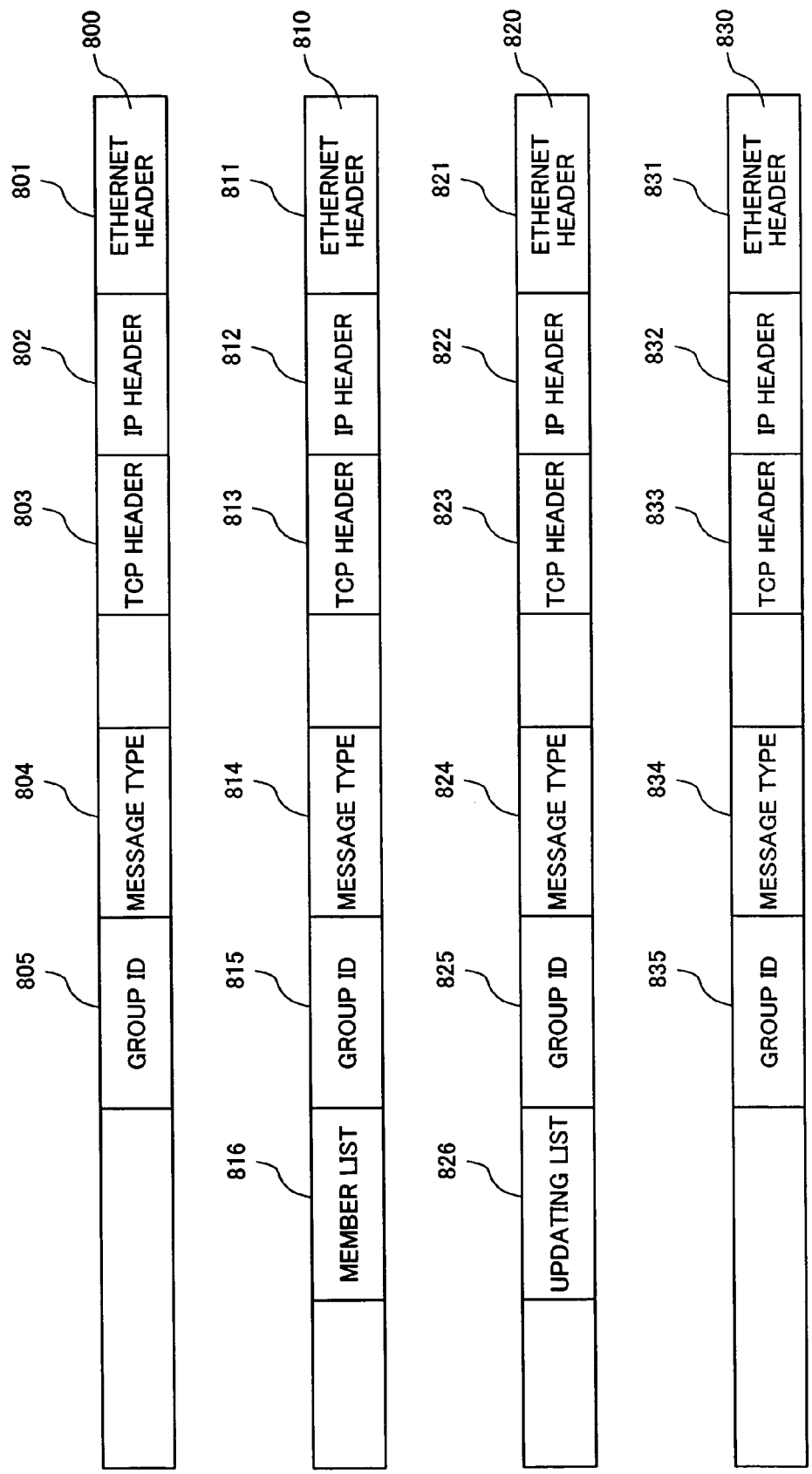
FIG. 15 is a diagram showing formats of a message packet of the system of FIG. 1.

FIG. 15 shows example formats of the messages exchanged between the sensor net server 114 and the PTT server 113. The 800 is a member list request to be sent at step 177, which contains a message type 804 (the value is 001) and a group ID 805. The 810 is a member list sending to be sent at step 178, which contains a message type 814 (the value is 010), a group ID 815, and a member list 816 of the users included in the group. The 820 is a member list updating to be sent at step 155, which contains a message type 824 (the value is 011), a group ID 825, and an updated list of users that have been added to or deleted from the group. The 830 is an update confirmation to be sent at step 156, which contains a message type 834 (the value is 100) and a group ID 835.

FIG. 10 shows an example configuration of the user location management table 207 in the sensor net server 114. Sensor IDs are recorded under the 721 and base station IDs are under the 722, and both IDs are associated with each other in the table.

FIG. 11 shows an example configuration of the group management table 208 in the sensor set server. Base station IDs are recorded under the 711 and group IDs are under the 712, and both IDs are associated with each other in the table.

FIG. 12 shows an example configuration of the group management table 307 in the PTT server. User IDs are recorded under the 731 and group IDs are under the 732, and both IDs are associated with each other in the table.

Figure 6:
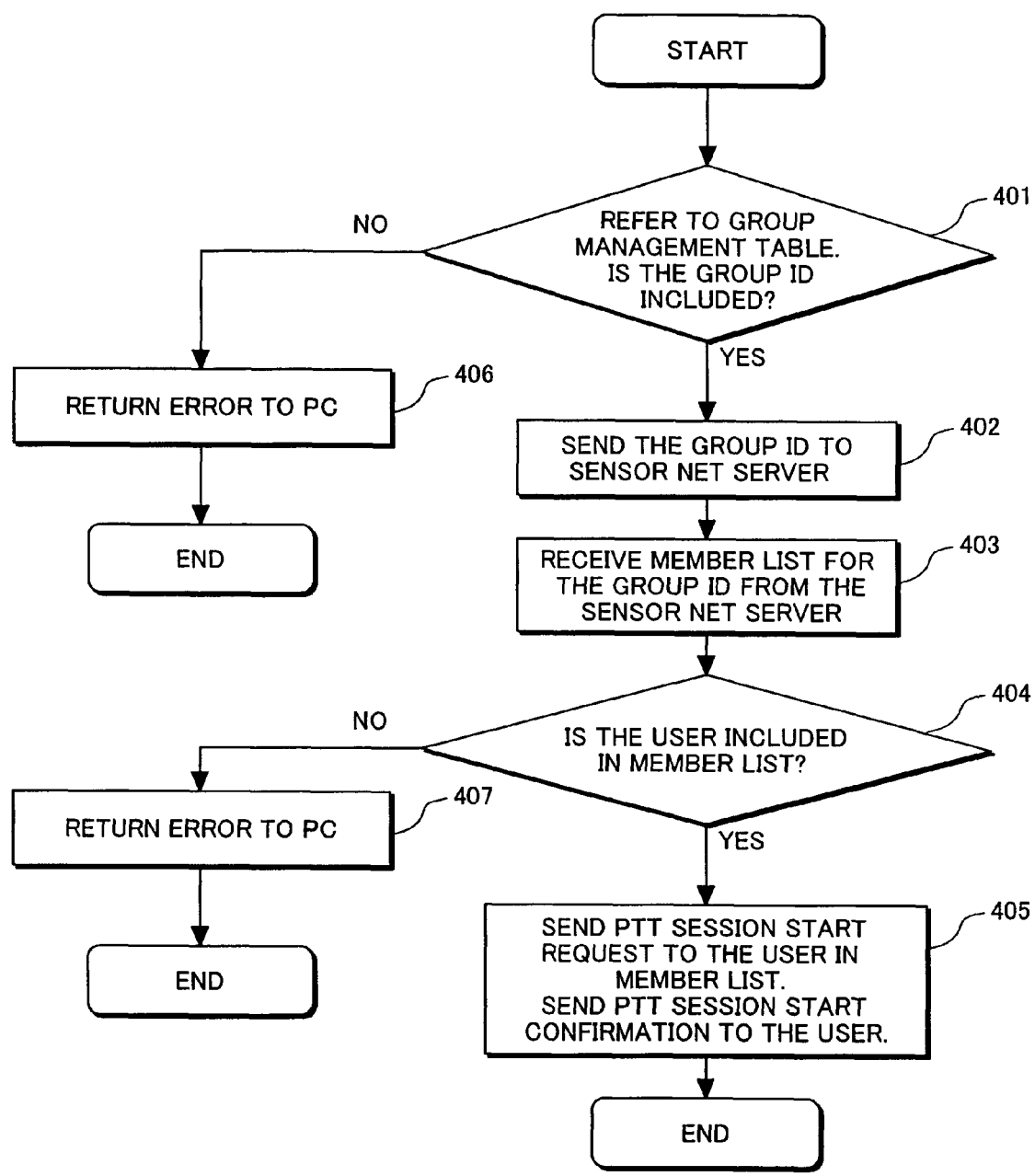
FIG. 6 is a flowchart of the processing by a sensor net server in the system of FIG. 1.

FIG. 6 is a flowchart showing an example operation flow of the PTT server 113 from step 135 to 142. Upon receipt of a PTT session start request, the PTT server 113 checks if the group ID contained in this PTT session start request is included in the group management table 307, at step 401. If it is not included, then the PTT server returns an error to the PC 118 at step 406 and terminates the communication. If included, the PTT server sends the group ID to the sensor net server at step 402. At step 403, the PTT server 113 receives the member list for the group ID from the sensor net server, and at step 404 checks if valid users are included in the received member list. If not included, the PTT server returns an error to the PC 118 at step 407 and terminates the communication.

Figure 7:
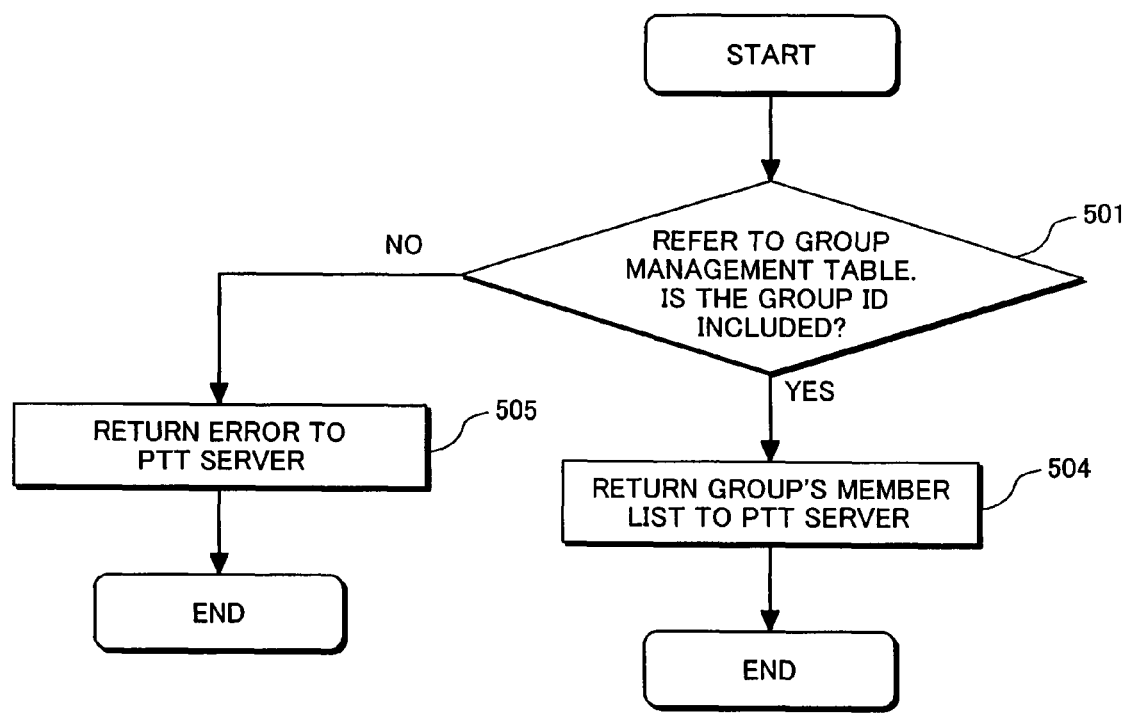
FIG. 7 is a flowchart of the processing by a PTT server in the system of FIG. 1.

FIG. 7 is a flowchart showing an example operation flow of the sensor net server 114 from step 137 to 138. Upon receipt of a member list request, the sensor net server 114 checks if the group ID contained in the received member list request is included in the group management table 208, at step 501. If it is not included, the sensor net server returns an error to the PTT server 113 and terminates the communication. If included, the sensor net server sends a list of users included in a group with the above group ID to the group management table, at step 502.

Figure 8:
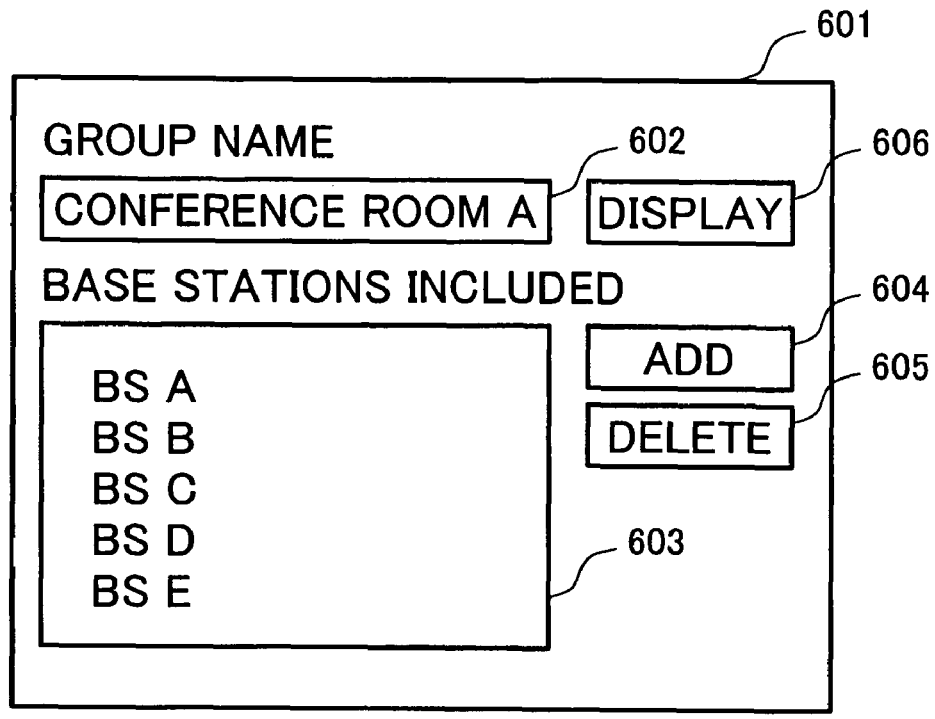
FIG. 8 shows an administrator input screen of a sensor net server.
Figure 9:
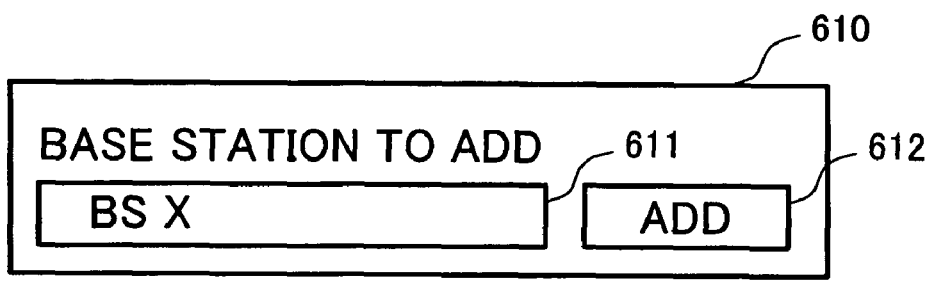
FIG. 9 shows another administrator input screen of a sensor net server.

FIGS. 8 and 9 show an example administrator interface of the sensor net server 114. The 601 in FIG. 8 is a group editing GUI (Graphical User Interface). When the user enters a group name to be displayed in the group name input field 602 and clicks on the DISPLAY button, the IDs of the base stations included in the group are displayed in the base station list display field 603. If the administrator wants to add one or more base stations, he or she clicks on the ADD button, enters one or more base station IDs in the input field in the base station add window 610, and then clicks on the ADD button 612. To delete one or more base stations from the group, the administrator selects one or more base station IDs to be deleted from those displayed in the base station list display field 603, and clicks on the DELETE button 605.

What is claimed is:

1. A network system including a plurality of clients, an application server, a plurality of sensors each associated with a respective user of a plurality of users, at least one base station that terminates wireless communications from said plurality of sensors, and a sensor net server which includes a control processing processor, wherein:

said sensor net server has a storage device that stores a first association between each of said plurality of sensors and a corresponding base station of said at least one base station and a second association between each of said at least one base station and a corresponding group of a plurality of groups;

said control processing processor performs setting of a third association between each of said users and a corresponding group of said plurality of groups according to said first and second associations; and said application server contains a control unit that controls applications based on said plurality of groups; wherein:

said application server comprises a communication interface unit, a control processing processor, and a data storage device;

said control processing processor further performs processing of obtaining information on said groups from said sensor net server, and communicating with said sensor net server; and said data storage device stores a group management table that manages said group information; wherein:

said application server sends a member list request for a specified group to said sensor net server during application control;

said sensor net server that received said request sends a member list including the users in said specified group to said application server;

said application server that received said member list establishes a communication session with a user included in said member list; wherein:

said sensor net server sends a member list updating to said application server; and said application server that received said member list updating updates said group management table based on said member list updating, and establishes a communication session with a user that is included in said specified group in said group management table at the time of establishing the session.

2. A network system according to claim 1, wherein:

said sensor net server comprises a communication interface unit, said control processing processor, and said data storage device;

said control processing processor further performs processing of user location information management, setting said groups according to user locations, communicating with said application server, and communicating with said at least one base station; and said data storage device stores a user location management table that manages the locations of said users each having one of said plurality of sensors, and a group management table that manages a group consisting of at least one of said users.

3. A network system according to claim 1, wherein said control unit of said application server controls communications applications only available within one group of said plurality of groups based on context information.

4. A network system according to claim 3, wherein said communications applications include Push-to-Talk (PTT) and third party call control (3PCC).

* * * * *